July 19, 1932.  A. N. MERLE  1,868,331

MOTION PICTURE APPARATUS

Filed Nov. 28, 1930

ANDRÉ NOËL MERLE
INVENTOR;
By Otto Meat
his Attorney.

Patented July 19, 1932

1,868,331

UNITED STATES PATENT OFFICE

ANDRÉ NOËL MERLE, OF VINCENNES, FRANCE, ASSIGNOR TO PATHE CINEMA, ANCIENS ETABLISSEMENTS PATHE FRERES, OF PARIS, FRANCE

MOTION PICTURE APPARATUS

Application filed November 28, 1930, Serial No. 498,527, and in France January 7, 1930.

The present invention relates to motion picture apparatus in which a claw link and a shutter are actuated by a common crank rotatable on a driving shaft.

In conformity to the invention, the shutter is guided near one end and is pivoted at the other end directly to an axle which is rigidly connected with the crank and is situated at a certain distance from the crank-pin to which the claw link is pivoted.

The guide for the shutter consists preferably of the claw link itself, and on the other hand, the shutter and its guides which are formed at each end may consist of the same piece of sheet metal.

This arrangement affords a very simple construction for the apparatus.

Further advantages and features of the invention will be specified in the following description.

The accompanying drawing shows by way of example an embodiment of the invention.

Figure 2:
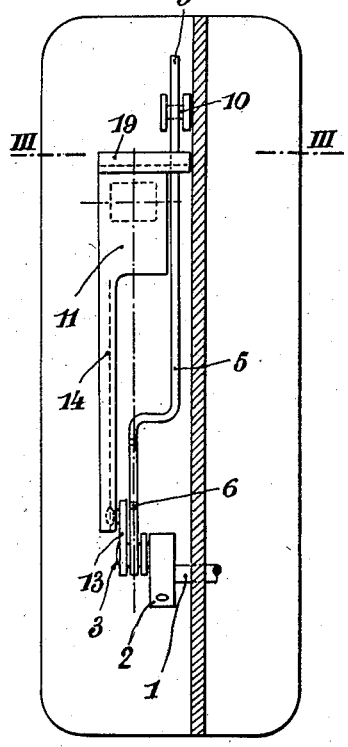
Fig. 2 is a section on the line II—II of Fig. 1.

The driving shaft 1 of the motion picture apparatus carries a crank 2 upon which a crank-pin 3 is rigidly mounted. Upon the said crank-pin is freely rotatable a sleeve 4 on which is mounted a claw link 5 provided with claws 6 adapted for insertion into the perforations 7 of the film 8. At the upper end of said claw link 5 is a fork 9 which surrounds a stationary guiding pin 10.

The shutter 11 is pivoted at the lower end to an axle 12 mounted on the end of an arm 13, which is rigidly connected with the handle 2, said arm 13 being riveted to the crank-pin 3. The angle between said arm 13 and the crank 2 should obviously be given such value that the shutter will cover the lens during the time in which the film is drawn forward.

The shutter 11 consists simply of a sheet metal piece whose lower part 14 is bent at right-angles and is pierced with an aperture in which is engaged the axle 12. The upper part of the shutter is also bent at right-angles, so as to form a flat part 15 pierced with a guiding aperture 16. The end of the said flat part 15 is bent up at 19 in such manner that the closing portion will come near the film, and thus the shutter will act more effectively. Any suitable guiding member may be engaged in the guiding aperture 16, but in the present example the guide consists of the claw link 5 itself.

This arrangement affords a particularly simple construction. The shutter may be made simply of one piece of sheet metal, together with all of its accessory parts, and it is not necessary to employ a special guide for the shutter, as the guide consists of the claw link itself.

Figure 1:
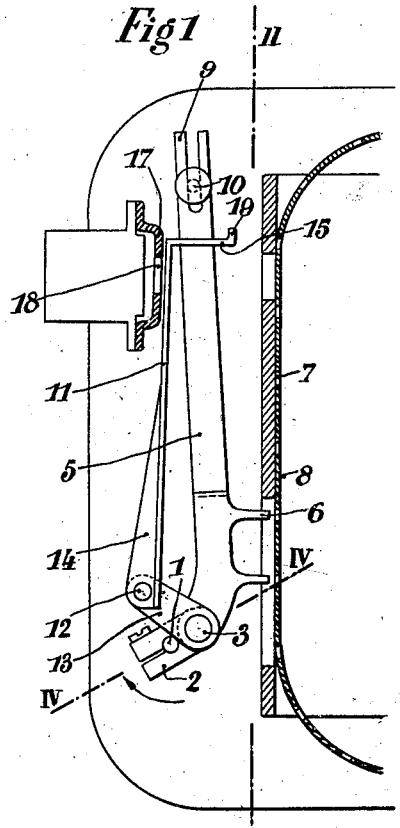
Fig. 1 is a side elevational view of the claw link and shutter.
Figure 3:
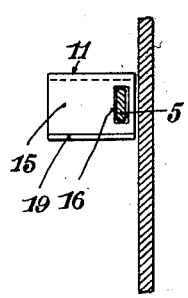
Fig. 3 is a section on the line III—III of Fig. 2.
Figure 4:
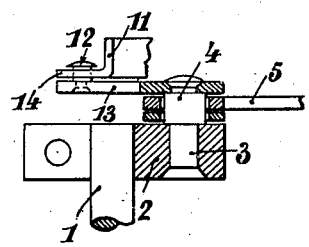
Fig. 4 is a section on the line IV—IV of Fig. 1.

The back part of the lens is contained in a small casing 17 pierced with an aperture 18, and said casing has a form such that the shutter 11 will fit exactly upon it when in the idle position (Fig. 1), thus preventing all light from entering the camera chamber itself, hence especially obviating all fogging of the film at a point adjacent the aperture formed in the gate for the insertion of the claws.

It is obvious that the construction herein described is susceptible of all desired modifications without departing from the principle of the invention.

Having now described my invention, what I claim as new and desire to secure by Letters Patent is:

1. In a motion picture apparatus, a rotatable shaft, a crank secured on said shaft, two pivots carried by said crank and spaced from each other angularly with relation to said shaft, a claw-carrying link pivoted at one end on one of said pivots, guiding means adapted to engage the other end of said link, a plane shutter pivoted at one end on the other of said pivots, and guiding means provided on the other end of said shutter and adapted to engage slidingly said link.

2. In a motion picture apparatus, a film gate, a rotatable shaft disposed in parallel and transversal relation with said film gate, a crank secured on said shaft, two pivots carried by said crank and spaced from each other angularly with relation to said shaft, a claw-carrying link pivoted at one end on one of said pivots, guiding means adapted to engage the other end of said link, a plane shutter substantially parallel to said film gate, pivoted at one end on the other of said pivots and formed at its other end with an extension which is substantially perpendicular to said film gate and parallel to said shaft and which is provided with an aperture in which said link is adapted to slide.

3. In a motion picture apparatus, a film gate, a rotatable shaft disposed in parallel and transversal relation with said film gate, a crank secured on said shaft, two pivots carried by said crank and spaced from each other angularly with relation to said shaft, a claw-carrying link pivoted at one end on one of said pivots, guiding means adapted to engage the other end of said link, a plane shutter formed of a sheet of metal substantially parallel to said film gate and having at one end along its longitudinal edge an extension which is perpendicular to said shaft and is provided with an aperture adapted to engage the other of said pivots, and guiding means adapted to engage the other end of said shutter.

4. In a motion picture apparatus, a gate provided with an exposure aperture in which a film is adapted to be guided, an objective lens disposed with its optical axis in alignment with the center of said exposure aperture, a plate adapted to bear on said objective lens on the side towards the gate and provided with an opening in the optical axis of said lens, and disposed between said gate and said plate: a rotatable shaft disposed in parallel and transversal relation with said film gate, a crank secured on said shaft, two pivots carried by said crank and spaced from each other angularly with relation to said shaft, a claw-carrying link pivoted at one end on one of said pivots, guiding means adapted to engage the other end of said link, a plane shutter substantially parallel to said film gate, pivoted at one end on the other of said pivots and adapted to bear on said plate, during the film feeding stroke of the claw-carrying link, an extension provided on the other end of said shutter and substantially perpendicular to said film gate and parallel to said shaft and adapted to cooperate with said shutter for covering said exposure aperture, and guiding means adapted to engage the other end of said shutter.

In testimony whereof I have signed my name to this specification.

ANDRÉ NOËL MERLE.